(12) United States Patent
Fukuyama et al.

(10) Patent No.: US 7,095,922 B2
(45) Date of Patent: Aug. 22, 2006

(54) LENSED FIBER ARRAY AND PRODUCTION METHOD THEREOF

(75) Inventors: Masashi Fukuyama, Inuyama (JP); Hironori Kurimoto, Kounan (JP)

(73) Assignee: NGK Insulators, Ltd., Nagoya (JP)

( * ) Notice: Subject to any disclaimer, the term of this patent is extended or adjusted under 35 U.S.C. 154(b) by 155 days.

(21) Appl. No.: 10/392,089

(22) Filed: Mar. 19, 2003

(65) Prior Publication Data

US 2003/0185508 A1    Oct. 2, 2003

Related U.S. Application Data

(60) Provisional application No. 60/367,530, filed on Mar. 26, 2002.

(51) Int. Cl.
G02B 6/32 (2006.01)
(52) U.S. Cl. .......................................... 385/33; 385/53
(58) Field of Classification Search ................ 385/33, 385/119, 53–94
See application file for complete search history.

(56) References Cited

U.S. PATENT DOCUMENTS

| 4,830,456 | A | * | 5/1989 | Kakii et al. ................... 385/75 |
| 5,810,968 | A | | 9/1998 | Dannoux |
| 5,812,720 | A | | 9/1998 | Dannoux |
| 5,832,149 | A | | 11/1998 | Omizu et al. |
| 5,861,637 | A | * | 1/1999 | Oishi ............................ 257/98 |
| 6,045,269 | A | * | 4/2000 | Watanabe et al. ............. 385/59 |
| 6,099,684 | A | | 8/2000 | Dannoux |
| 6,130,444 | A | | 10/2000 | Hashizume et al. |
| 6,324,332 | B1 | * | 11/2001 | Yamashita et al. ........... 385/137 |
| 6,768,837 | B1 | * | 7/2004 | Thual et al. ................... 385/33 |
| 2002/0094178 | A1 | * | 7/2002 | Matsumoto et al. ........ 385/115 |
| 2003/0175000 | A1 | * | 9/2003 | Caracci et al. ............... 385/137 |
| 2003/0231850 | A1 | * | 12/2003 | Filhaber et al. .............. 385/137 |
| 2004/0105611 | A1 | * | 6/2004 | Bischel et al. ................ 385/14 |

FOREIGN PATENT DOCUMENTS

| JP | 63-213807 | 9/1988 |
| JP | 07-199002 | 8/1995 |
| JP | 07-281060 | 10/1995 |
| JP | 08-271763 | 10/1996 |
| JP | 09-133834 | 5/1997 |
| JP | 11-223742 | 8/1999 |
| JP | 11-311722 | 11/1999 |
| JP | 2002-148467 | 5/2002 |

\* cited by examiner

*Primary Examiner*—Sung Pak
*Assistant Examiner*—Tina M. Wong
(74) *Attorney, Agent, or Firm*—Burr & Brown

(57) ABSTRACT

A lensed fiber array is provided with lensed fibers whose front end faces are formed in a lens shape, a substrate in one of whose faces a plurality of grooves respectively matching said lensed fibers are formed, and a fixing member which aligns and fixes said lensed fibers by suppressing them against the grooved face of the substrate. The substrate, lensed fibers, and the fixing member are fastened to one another with adhesive. The front end faces of the lensed fibers are protruded from the front end face of either the substrate or the fixing member. This lensed fiber array can prevent deterioration in optical characteristics by preventing the adhesive from sticking to the front end faces of the lensed fibers.

13 Claims, 7 Drawing Sheets

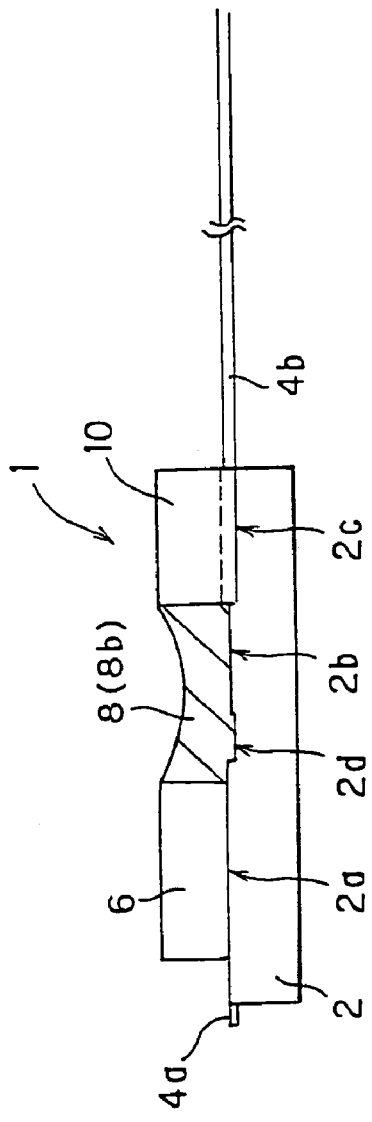
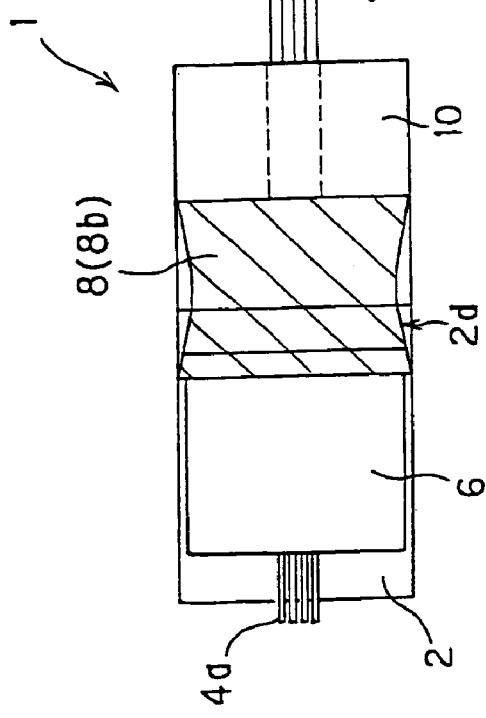
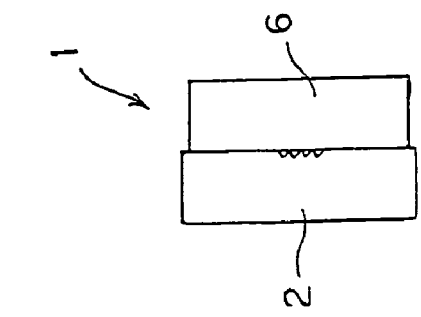

LENSED FIBER ARRAY AND PRODUCTION METHOD THEREOF

BACKGROUND OF THE INVENTION AND RELATED ART STATEMENT

The present invention relates to a lensed fiber array using lensed fibers each consisting of an optical fiber whose front end face is formed in a lens shape and a production method therefor, and more particularly to a lensed fiber array prevented from deterioration in optical characteristics by any adhesive sticking to the front end faces of its lensed fibers and a production method therefor.

In recent years, lensed fibers have come into use as optical fibers for coupling to laser diodes (LD) and semiconductor optical amplifiers (SOA). Lensed fibers are optical fibers whose front end faces are formed in a lens shape; they can converge lights having come incident by the lens effect of the fiber themselves and take those lights into the fiber cores without fail. Therefore, they have the advantage of being able to enhance the coupling efficiency of LDs and SOAs. And along with the increasing arrayed (multi-core) use of LD and SOAs, the demand is also rising for lensed fiber arrays in each of which lensed fibers are aligned in a multi-core manner.

Incidentally, an ordinary optical fiber array is configured of a plurality of optical fibers, a substrate in one of whose faces a plurality of grooves respectively matching the plurality of optical fibers are formed, and a fixing member which aligns and fixes the plurality of optical fibers by pressing them against the grooved face of the substrate, and these elements are fastened to one another with an adhesive.

Therefore, an ordinary optical fiber array can be produced by preparing a substrate in one of whose faces a plurality of grooves respectively matching the plurality of optical fibers are formed, mounting the plurality of optical fibers over the plurality of grooves in that substrate, aligning and fixing the plurality of optical fibers by pressing them against the grooved face of the substrate with a fixing member, and fastening these elements to one another with an adhesive.

The optical fiber array produced in this manner undergoes a process known as facing, namely polishing of its front end faces, to polish the front end faces of the optical fibers or to remove any adhesive that may have become stuck to the front end faces of the optical fibers, because if any adhesive is stuck to the front end faces of the optical fibers (especially the front end faces of the fiber cores), the optical characteristics of the optical fibers may be significantly deteriorated.

As a lensed fiber array has a basically similar structure to the ordinary optical fiber array, it can be produced in a manner similar to the above-described production method.

However, if a lensed fiber array is subjected to end face polishing after it is produced according to the above-described production method, there arises a problem that the lens parts at the front ends of the lensed fibers will be chipped off and become unable to function as originally intended, even though any adhesive that may have become stuck to the front end faces of the optical fibers can be removed. Thus, it is difficult to remove any adhesive stuck to the front end faces of lensed fibers subsequently by facing (i.e., polishing) as in the case of ordinary optical fibers.

The present invention has been completed, in view of the above-mentioned problem, and therefore its object is to provide a lensed fiber array of such a structure that, when the substrate, the lensed fibers and the fixing member are to be fastened to one another with adhesive, the adhesive is not allowed from the outset to stick to the front end faces of the lensed fibers and a production method therefor.

SUMMARY OF THE INVENTION

The present inventors have found, as a result of intensive studies to solve the above-mentioned problem, that the above-mentioned object can be achieved by protruding the front end faces of a plurality of lensed fibers from either a substrate or the front end face of a fixing member, and completed the present invention based on this finding. Thus, the present invention is to provide a lensed fiber array to be described below and a production method therefor.

A lensed fiber array is provided with lensed fibers whose front end faces are formed in a lens shape, a substrate on one of whose faces a plurality of grooves respectively matching the lensed fibers are formed, and a fixing member which aligns and fixes the lensed fibers by pressing them against a grooved face of the substrate. When the above elements are fastened to one another with an adhesive, front end faces of the lensed fibers protrude from at least one of the substrate or a front end face of the fixing member. Preferably, the front end face of the lensed fibers is formed in a lens shape by configuring each front end to have a tapered portion and a spherical portion continuing therefrom, and the starting portion of the tapered portion protrudes from either the substrate or the front end face of the fixing member.

In the lensed fiber array according to the present invention, the distance between the front end faces of the lensed fibers and either the front end face of the substrate or the fixing member is 50 μm or more.

The lensed fiber array according to the present invention is configured in such a manner that the positions of the front end face of the substrate and of the front end face of the fixing member are dislocated in the back-and-forth directions. Preferably, the front end face of the fixing member is positioned behind the front end face of the substrate.

The lensed fiber array according to the present invention includes such a structure that the portion from the lensed fiber-suppressing face of the fixing member to the front end face or rear end face of the fixing member is subjected to round-processing.

It is also preferable that the portion from the face of the substrate in which the grooves are formed to the front end face of the substrate is subjected to round-processing.

The lensed fiber array according to the present invention is constructed such that the rear end face of the fixing member is identical in back-and-forth position with the rear ends of the grooves in the substrate or positioned before the rear ends of the grooves in the substrate.

The lensed fiber array according to the present invention is configured such that the lensed fibers have covered lensed fibers in their rear portions, the substrate has an intermediate face and/or a covered lensed fiber supporting face positioned behind and lower than the face in which the grooves are formed, and a face in which the grooves are formed is continued stepwise until the intermediate face or the covered lensed fiber supporting face, thereby concave grooves for stoppage of an adhesive are formed on the intermediate face or the covered lensed fiber supporting face.

The lensed fiber array according to the present invention includes a meniscus formed of the adhesive in the vicinity of the front end face of the substrate and/or the front end face of the fixing member.

A method for producing a lensed fiber array according to the present invention includes the following steps. A substrate on one of whose faces grooves respectively matching lensed fibers are formed is prepared, and lensed fibers are mounted in the grooves of the substrate. The lensed fibers are pressed with a fixing member against the face of the substrate in which the grooves are formed, aligned and fixed. The substrate, the lensed fibers and the fixing member are fastened to one another with an adhesive, characterized in that a plurality of lensed fibers are mounted in such a manner that the front end faces of the lensed fibers protrude from the front end face of either the substrate or the fixing member. The substrate, the lensed fibers and the fixing member are fastened with one another by causing an adhesive to permeate gaps between the substrate, the lensed fibers and the fixing member from the rear end of the fixing member, when a plurality of lensed fibers are mounted on the grooves of the substrate.

BRIEF DESCRIPTION OF THE DRAWINGS

FIGS. 1(a) through 1(c) are diagrams illustrating a lensed fiber array, which is an example of the present invention; FIG. 1(a) shows a front view, FIG. 1(b), a plan view, and FIG. 1(c), a profile view.

FIG. 9(a) shows a front view, FIG. 9(b), a profile view, and FIG. 9(c), a rear view.

FIG. 10(a) shows a form in which the rear end face of the fixing member is positioned before the rear ends of the grooves of the substrate, and FIG. 10(b), a form in which the rear end face of the fixing member is positioned behind member the rear ends of the grooves of the substrate.

DETAILED DESCRIPTION OF THE INVENTION

A working example of a lensed fiber array and a production method therefor according to one embodiment of the present invention will be explained below in a concrete manner with reference to drawings. Moreover, a lensed fiber array according to the present invention can include, in addition to those in each of which a plurality of lensed fibers are aligned, ones using a single lensed fiber each, but the present invention is particularly effective when applied to those in each of which a plurality of lensed fibers are aligned. In the following description, an explanation will be made by referring to cases in which a plurality of lensed fibers are aligned in the array.

In trying to develop the lensed fiber array according to the present invention, the present inventors firstly studied the reason why adhesive sticks to the front end faces of the lensed fibers (hereinafter to be sometimes referred to as simply "fibers"). As a result it was found that the adhesive caused to permeate between the substrate and the fixing member flowed along the fibers in a capillary action and eventually around toward the front end faces of the fibers.

Figure 2:
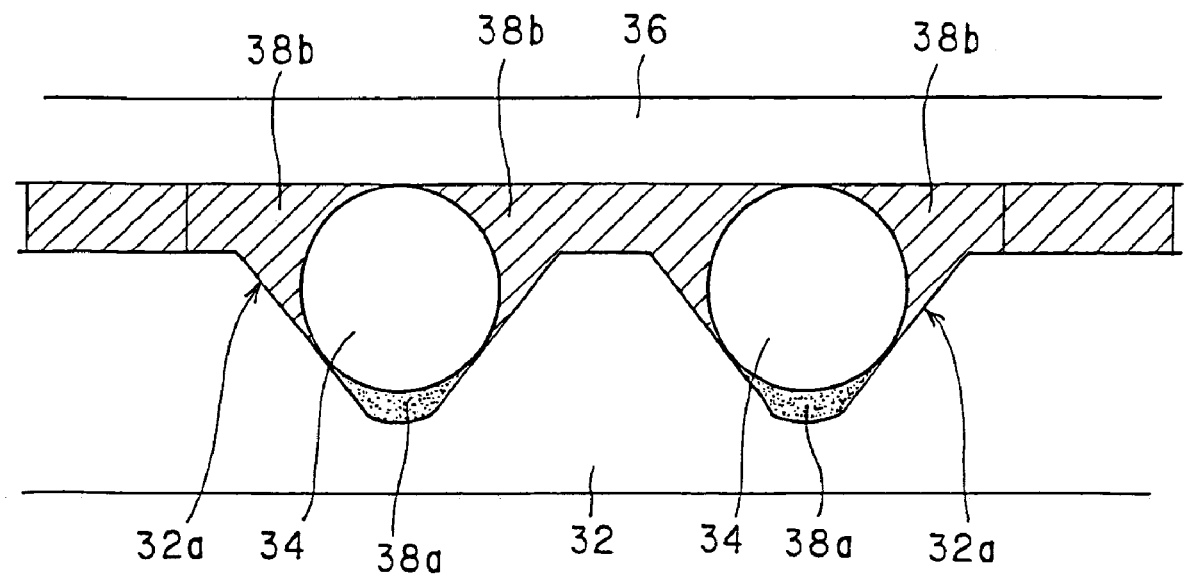
FIG. 2 is an enlarged section showing a section of the lensed fiber array on an enlarged scale.

For instance as shown in FIG. 2, adhesive 38b at the upper ends of lensed fibers 34 is not only greater in volume than adhesive 38a at the lower ends of the lensed fibers 34 but also, as it is in a closed space between a plurality of grooves 32a formed in the substrate 32 and a fixing member 36, is caused by a capillary action to flow into an open space, i.e. toward the front end faces of the lensed fibers 34. Eventually, the adhesive migrates toward and sticks to the front end faces of the lensed fibers 34.

Since an adhesive is caused to stick to the front end faces of the fibers due to capillary action, as described above, the adhesive may be prevented from sticking to the front end faces of the fibers by stopping the capillary action while the adhesive is flowing around to reach the front end faces of the fibers.

Therefore, it was decided to protrude the front end faces of the plurality of lensed fibers from either the front end face of the substrate or the fixing member in the present invention. In this way, even if an adhesive at the upper ends of the fibers is caused to flow towards the front end faces of the fibers due to capillary action, the flow will be deterred at the front end face of either the substrate or the fixing member, whichever may be positioned behind, and eventually stop. Therefore, the adhesive cannot reach and does not stick to the front end faces of the fibers.

Figure 3:
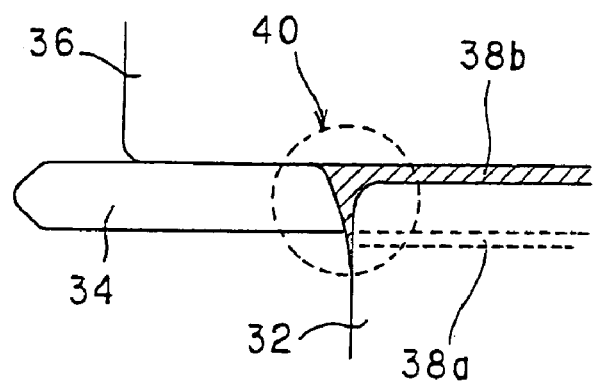
FIG. 3 is a profile typically illustrating a lensed fiber array according to one embodiment of the present invention.

Further, according to the present invention, since the space is opened at the front end face of the substrate 32 or the fixing member 36, whichever may be positioned behind, as shown in FIG. 3, it is possible to form a meniscus 40 from adhesive in the vicinity of the front end face of the substrate 32 and/or the front end face of the fixing member 36 (1) by utilizing surface tension or wettability, (2) by appropriately adjusting the quantity of the adhesive or (3) by separately forming a pad of adhesive in the pertinent part.

In a lensed fiber array in which a meniscus is formed as described above, it is possible to prevent any moisture from permeating between the substrate and the fixing member, and this feature is also desirable in that high durability in a high temperature and high humidity ambience can be ensured. As the meniscus is an adhesive part that hardens in an open space and the residual curing stress within the adhesive is extremely small, such an adhesive part excels in durability. On the other hand, as another method to prevent adhesive from sticking to the front end faces of fibers, a method of using an ultraviolet-setting adhesive and curing it before the adhesive reaches the front ends of fibers by irradiating it with ultraviolet rays instead of protruding the fibers from the front end face of the substrate or the like as in the present invention. However, a lensed fiber array obtained by such a method is undesirable because it may have portions not filled with adhesive between the fixing member and the substrate. Therefore, there is a fear that its durability in a high temperature and high humidity ambience might be reduced due to the separation of the fixing member from the substrate. Also, as the adhesive part cured between the fixing member and the substrate hardened in a closed space with some residual curing stress remaining within the adhesive. Therefore, one may say that the durability is not so high merely in that part.

Figure 4:
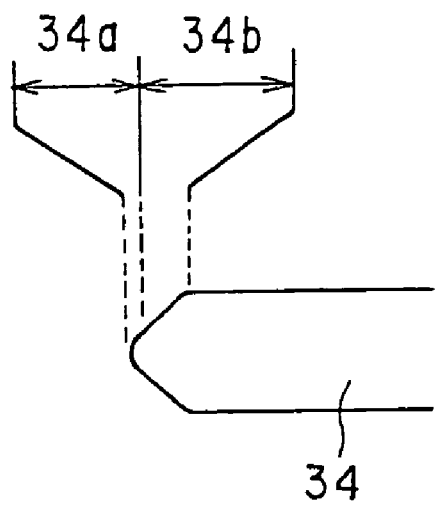
FIG. 4 is an enlarged diagram showing the front end portion of a lensed fiber on an enlarged scale.

Further according to the invention, it is preferable, where the front ends of the plurality of lensed fibers 34 to be configured of tapered portions 34b and spherical portions 34a continuous therefrom and these front end faces are formed in a lens shape as shown in FIG. 4, for the starting portions of the tapers of the plurality of lensed fibers to protrude from the front end face of either the substrate or the fixing member.

Since in the above-described arrangement the facial angle changes in the starting portion of the taper portion, the adhesive having flowed along the fibers is obstructed from wetting the fibers and its flow stops. Therefore, the adhesive can be effectively prevented from sticking to the front end faces of fiber cores. By contrast, in the case where the starting portion of the tapered portions does not protrude, the space between the starting portion of the tapered portions and the spherical portions of the fibers is opened, and the capillary action stops therein. Since this part is on substantially the same plane as the front end faces of fiber cores, the adhesive relatively easily flows into until the fiber cores.

Further according to the invention, it is preferable for the distance from the front end faces of the plurality of lensed fibers to the front end face of either the substrate or the fixing member to be 50 μm or more, more preferable to be 100 μm and especially preferable to be 300 μm. In this way, even if the meniscus is left for a long period of time after its formation, the adhesive can be prevented from coming around to at least the front end faces of fiber cores.

Figure 5:
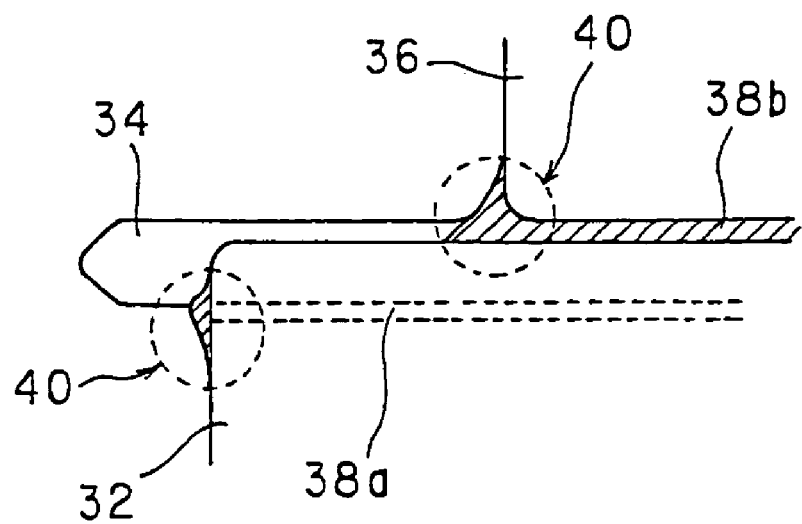
FIG. 5 is a profile view typically illustrating a lensed fiber array according to one embodiment of the present invention.

Also according to the present invention, it is preferable that the front end face of the substrate and the front end face of the fixing member are dislocated in the back-and-forth directions. For instance by positioning the front end face of the substrate 32 and the front end face of the fixing member 36 discrepant in the back-and-forth directions as shown in FIG. 5, it is made possible to form a meniscus 40 as to the adhesive 38b at the upper ends of the lensed fibers 34 in the vicinity of the front end face of the fixing member 36 and as to the adhesive 38a at the lower end of the lensed fibers 34 in the vicinity of the front end face of the substrate 32. This arrangement would reduce the risk of the protruding lensed fibers 34 to be broken or otherwise damaged.

Figure 6:
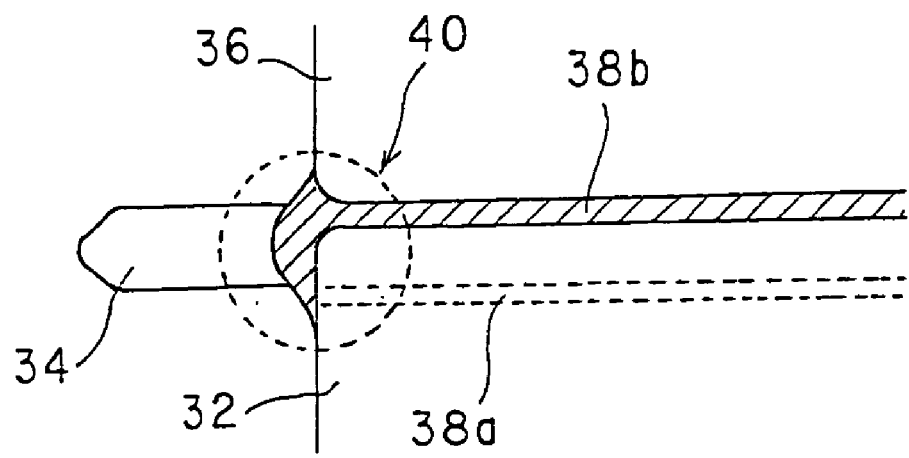
FIG. 6 is a profile view typically illustrating a lensed fiber array according to one embodiment of the present invention.

Thus if, for instance, the front end face of the substrate 32 and the front end face of the fixing member 36 are not discrepant but identical in position as shown in FIG. 6, the adhesive 38b at the upper end of the lensed fibers 34 and the adhesive 38a at the lower end of the lensed fibers 34 will form a single meniscus 40 on the same plane. Compared with such an embodiment as mentioned above, the embodiment shown in FIG. 5 makes it possible to decrease the quantity of adhesive to form the meniscuses 40 and accordingly to reduce the stress due to the curing contraction of the adhesive and the stress due to their expansion or contraction accompanying thermal variations. Thus, one may effectively reduce the risk of the protruding lensed fibers 34 to be broken or otherwise damaged.

Also, by positioning the front end face of the substrate and the front end face of the fixing member to be discrepant in the back-and-forth directions, it is made possible to prevent the adhesive from flowing around to the front end faces of the fibers while protecting the protruding fibers.

Figure 7:
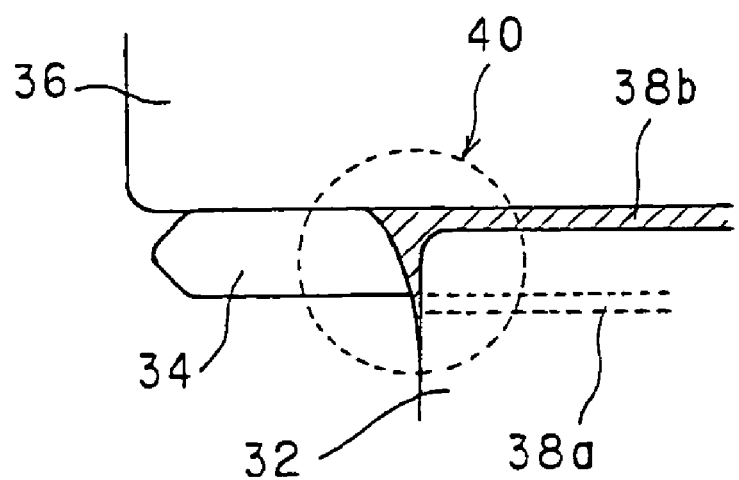
FIG. 7 is a profile view typically illustrating a lensed fiber array according to one embodiment of the present invention.

If, for instance, the front end face of the fixing member 36 is arranged in the vicinity of the front end faces of the lensed fibers 34 and positioning it behind the substrate 32 front end face as shown in FIG. 7, as the adhesive will form the meniscus 40 in the vicinity of the front end face of the substrate 32 away from the front end faces of the lensed fibers 34, not only can the adhesive be prevented from flowing around to the front end faces of the lensed fibers 34, but also will the lensed fibers 34 be protected by the fixing member 36 to the vicinity of their front end faces and therefore not be fully exposed, the risk of the protruding lensed fibers 34 to be broken or otherwise damaged by some external factor, the stress due to the curing contraction of the adhesive or the stress due to their expansion or contraction accompanying thermal variations.

However, according to the present invention, it is preferable that the front end face of the fixing member 36 is positioned behind the front end face of the substrate 32 as shown in, for instance, FIG. 5. Since the protruding lensed fibers 34 can be protected in a state in which they are mounted in the grooves formed in the substrate 32 by constructing so, the lensed fibers 34 can be protected in a more stable and reliable state than in a state in which a simple plane, such as that of the fixing member 36, is in contact with the lensed fibers 34.

Figure 8:
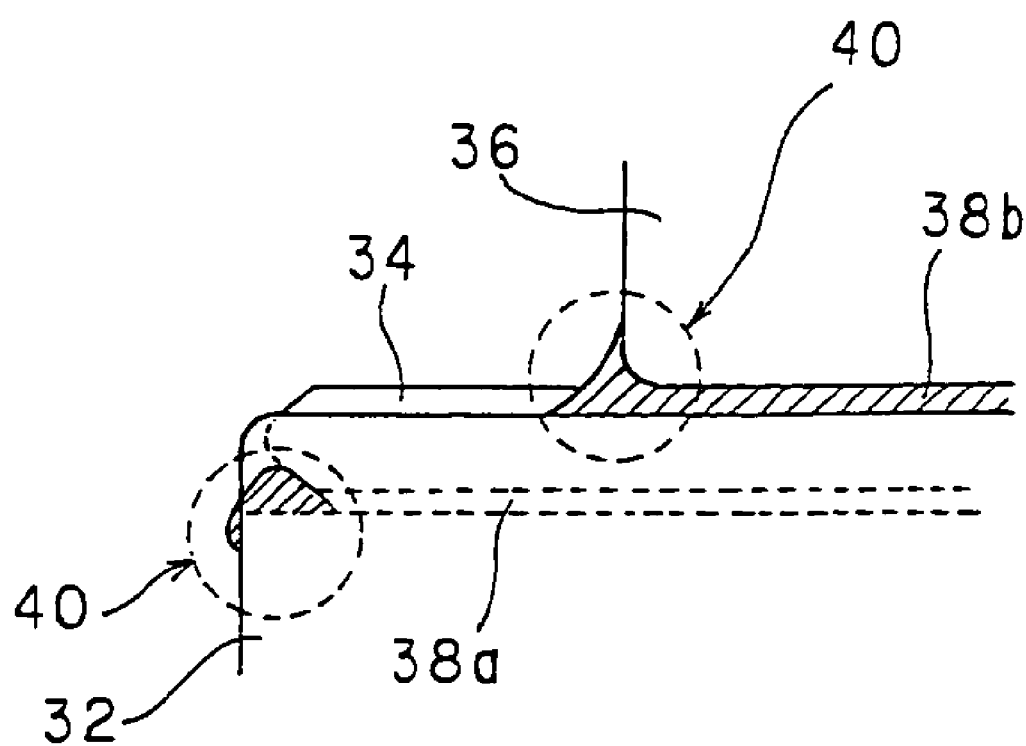
FIG. 8 is a profile view typically illustrating a lensed fiber array according to one embodiment of the present invention.

Moreover, according to the present invention, if the front end faces of the fibers protrude from the front end face of either the substrate or the fixing member, the fibers need not protrude from the front end face of the other. Even if, for instance, the front end faces of the lensed fibers 34 are positioned behind the front end face of the substrate 32 as shown in FIG. 8, the adhesive 38a at the lower end of the lensed fibers 34 will be small in quantity and accordingly it will make the adhesive difficult to flow around to the front end faces of the lensed fibers 34, the advantage of the invention can be achieved.

Further according to the present invention, it is preferable to subject the portion from the lensed fiber-pressing face of the fixing member to the front end face or rear end face of the fixing member to a round processing, and the face of substrate in which grooves are formed to the front end face of the substrate to a round processing. Since the round processing of these portions eliminates edges formed by the front end face of the fixing member and the like that might damage the fibers, the fibers can be safely fixed without suffering any damage. In an ordinary optical fiber array, even if optical fibers are damaged by edges formed by the front end face of the fixing member and the like, the damaged portions can be subsequently removed by face polishing, the above-described structure is very effective for the lensed fiber array which cannot be subjected to face-polishing as explained previously.

Moreover, since those portions gradually change the facial angle by subjecting it to round-polishing, it makes the adhesive wet easier with the front end face of the fixing member and the like, and it makes the adhesive move to the front end face of the fixing member and the like; thus, it is made possible to more effectively prevent the adhesive from sticking to the front end faces of the fibers.

In producing the lensed fiber array according to the present invention, it is preferable to mount them in such a manner that the front end faces of the plurality of lensed fibers protrude from the front end face of either the substrate or the fixing member, thereby the adhesive is caused to permeate the gaps between the substrate, the lensed fibers and the fixing member from the rear end of the fixing member to fasten the substrate, the lensed fibers and the fixing member to one another, when a plurality of lensed fibers is mounted in the plurality of grooves of the substrate.

This enables the front end faces of the plurality of lensed fibers to protrude from the front end face of either the substrate or the fixing member, thereby the advantage of the lensed fiber array according to the present invention may be realized. Also, since the adhesive permeates the gaps between the substrate, the lensed fibers and the fixing member from the rear end of the fixing member by a capillary action and the meniscus is formed at the front end face of the substrate or the fixing member, whichever may be positioned behind, the adhesive can be more effectively prevented from flowing around to the front end faces of the fibers. However, since the adhesive permeates the gaps between the substrate, the lensed fibers and the fixing member, which constitute a closed space, due to capillary action towards the rear end of the fixing member, the advantage of the invention can be achieved, even in the case where the adhesive is applied to the front end face of the fixing member.

Figure 10A:
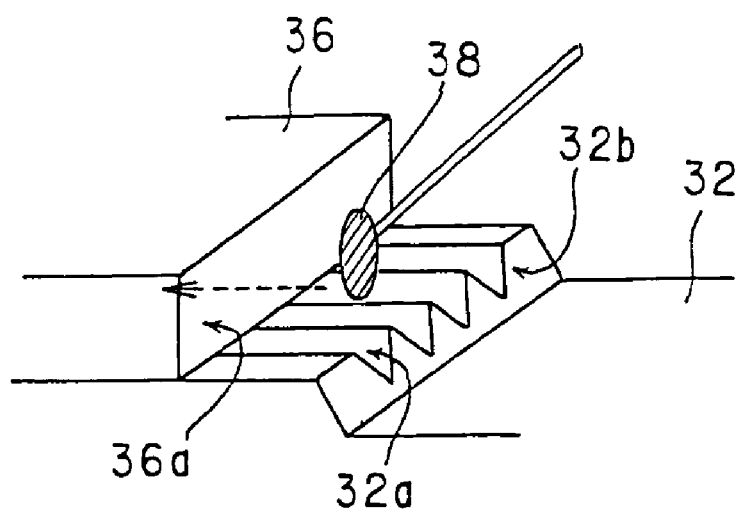
FIGS. 10(a) and 10(b) are perspective views typically illustrating a lensed fiber array according to one embodiment of the present invention.
Figure 10B:
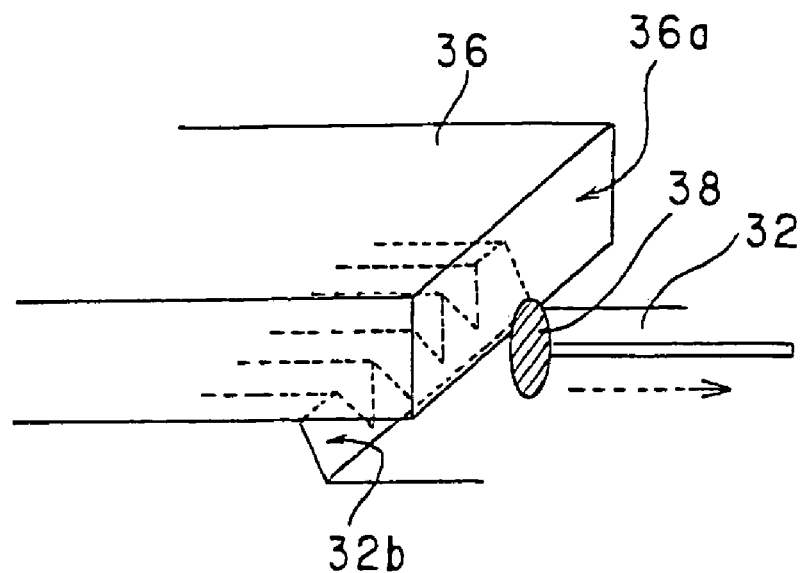

When the adhesive is caused to permeate the gaps between the substrate, the lensed fibers and the fixing member from the rear end of the fixing member as described above, it is preferable that the rear end face 36a of the fixing member 36 is identically positioned in the back-and-forth directions with or before the groove rear ends 32b of the substrate 32 as shown in, for instance, FIG. 10(a). If the structure is like this, it is possible to directly apply the adhesive 38 to the grooves 32a of the substrate 32 and the adhesive 38 will not flow backwards. Therefore, it is made possible to cause the adhesive 38 to permeate from the rear end face 36a of the fixing member 36 uniformly into the grooves 32a of the substrate 32. On the other hand, if the adhesive will have to be applied from the lower face (the fiber-pressing face) of the fixing member 36, it would be difficult to cause the adhesive 38 to permeate uniformly into the grooves 32a of the substrate 32, and cause the adhesive 38 to flow backwards, in the case where the rear end face 36a of the fixing member 36 is positioned behind the groove rear ends 32b of the substrate 32, as shown in FIG. 10(b) for instance.

According to the present invention, it is preferable to form concave grooves so as to stop the adhesive in the intermediate face or the covered lensed fiber supporting face, in the case where the lensed fibers have covered lensed fibers in their rear portions, the substrate has an intermediate face and/or a covered lensed fiber supporting face positioned behind and lower than the face in which the grooves are formed, and the face in which grooves are formed is made continuous by a level gap to the intermediate face or the covered lensed fiber supporting face.

When the adhesive to fasten together the substrate, the lensed fibers and the fixing member is caused to permeate from the rear end face of the fixing member in such a configuration, even if the adhesive flows toward behind the substrate, the flow of the adhesive will be blocked in the concave grooves portion, and no further backward flow will be made difficult. Such a configuration, as the present inventors already disclosed in JP-A-11-326704, can be suitably used where two kinds of adhesives differing in Young's modulus are used and caused to penetrate from the rear end face of the fixing member. The reason is that, as will be described afterwards, whereas an adhesive which has a large Young's modulus (which is hard) may be used to permeate the gaps between the substrate, the lensed fibers and the fixing member, if these adhesives having a large Young's modulus flows backwards, stresses due to its curing contraction and thermal expansion may pose a problem, which is an undesirable consequence.

Figure 9A:
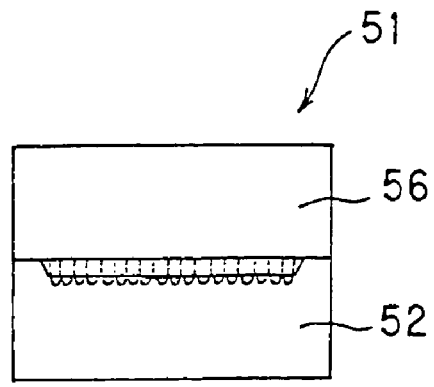
FIGS. 9(a) through 9(c) are diagrams illustrating a lensed fiber array according to the prior art.
Figure 9B:
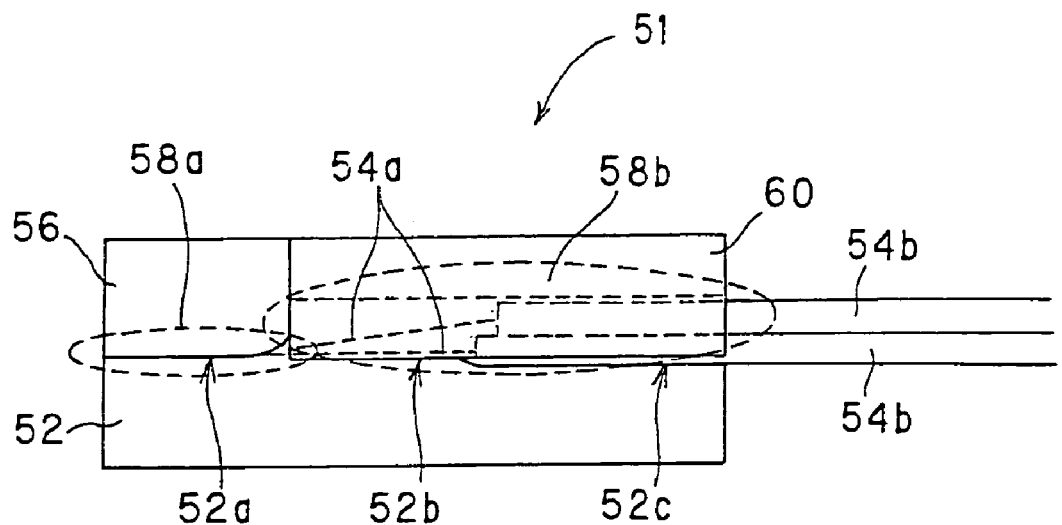
Figure 9C:
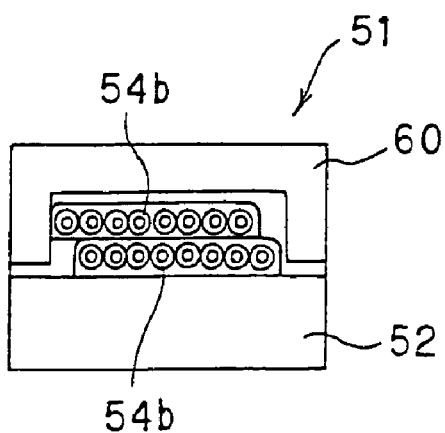

The contents disclosed in JP-A-11-326704 would be referred to hereinafter. FIGS. 9(a) through 9(c) illustrate an optical fiber array 51 wherein optical fibers 54a have covered optical fibers 54b in their rear portions, a substrate 52 has an intermediate face 52b and/or a covered optical fiber supporting face 52c positioned behind and lower than a face 52a in which grooves are formed, and the face 52a in which grooves are formed is made continuous by a level gap to the intermediate face 52b or the covered optical fiber supporting face 52c. And as is illustrated in the figures, the covered optical fibers 54b are pressed against the covered optical fiber supporting face 52c of the substrate 52 with a different pressing member 60 from a fixing member 56 to align and fix them, and the substrate 52, the covered optical fibers 54b and the pressing member 60 are fastened to one another with adhesives.

According to JP-A-11-326704, different adhesives are used for sticking the fixing member 56 to the face 52a in which grooves of the substrate 52 are formed and for sticking the pressing member 60 to the covered optical fiber supporting face 52c, and moreover a first adhesive 58a which has a larger Young's modulus (which is harder) is used for sticking the former while a second adhesive 58b which has a smaller Young's modulus (which is softer) is used for sticking the latter. In this way, the second adhesive 58b of which a larger quantity is filled does not so much contract when it cures and contracts because of its smaller Young's modulus and involves less residual stress because of its softness. On the other hand, the first adhesive 58a, though it is harder and bigger in the contraction, there is no problem involved due to less residual stress like as the above-mentioned because it is filled in a smaller quantity. Therefore, the optical fiber array 51 which is free from the separation of the substrate 52 from the fixing member 56 and the pressing member 60 by the curing contraction of the adhesives or residual stress and accordingly is highly reliable for a long period.

EXAMPLE

The present invention will be described below in more concrete manner with reference to an example t shown in FIGS. 1(a) through 1(c), but the present invention is in no way limited by this example.

A four-core lensed fiber array 1 was fabricated in this example. First, a substrate 2 in one of whose faces four grooves were formed to match four lensed fibers 4a was prepared. The dimensions of the substrate 2 were 5 mm in width, 12 mm in length and 1.5 mm in thickness. It was made of low-expansion borosilicate glass, and structured to have three faces stacked one over another including a face 2a in which grooves were to be formed, an intermediate face 2b and a covered lensed fiber supporting face 2c. The lengths of these faces were 5.5 mm, 3.5 mm and 3 mm, respectively. The concave grooves 2d to stop the adhesive were formed in the intermediate face 2b, and four V-shaped grooves were formed at a 0.25 mm pitch in the face 2a for forming grooves, which received the lensed fibers 4a having a V section.

Next was prepared a fixing member 6 to press the four lensed fibers 4a against the face of the substrate 2 in which the V-shaped grooves were formed and to align and fix them. The dimensions of the fixing member 6 were 4.7 mm in width, 4 mm in length and 1.5 mm in thickness, and the portion from the face of the fixing member 6 to press the lensed fibers 4a to the front end face and the rear end face was subjected to round-processing. The material was low-expansion borosilicate glass, the same as the material of the substrate.

As the lensed fibers 4a, lensed fibers having an outer diameter of 125 μm whose front end faces were formed in a lens shape by its fore end configuration comprising a tapered portion and a spherical portion continued therefrom were used. Also, these lensed fibers 4a had covered lensed fibers 4b in their rear portions. The covered lensed fibers 4b were of an individual type in which the four lensed fibers 4a were independent of each other.

A pressing member 10 was a one having a plate-shaped body of 5 mm in width, 3 mm in length and 1.2 mm in thickness on which four V-shaped grooves for receiving the covered lensed fibers 4b having an inscribed circle diameter of 0.255 mm were formed at a pitch of 0.26 mm. Although the pitch of the V-shaped grooves for receiving the covered lensed fibers 4b was 0.26 mm, greater than the 0.25 mm pitch of the V-shaped grooves for receiving the lensed fibers 4a, there was no problem because the difference from the pitch of the V-shaped grooves for receiving the lensed fibers 4a was only 35 μm even at the maximum, and this was more than offset by the advantage that mutual interference between the fibers during the positional adjustment of the four lensed fibers in back-and-forth directions could be prevented.

The four lensed fibers 4a were mounted in the four grooves of the substrate 2 so as to align their front ends, and pressed with the fixing member 6 against the face of the substrate 2 in which V-shaped grooves were formed to be aligned and fixed. In this process, the front end face of each lensed fiber 4a was protruded by 100 μm from the front end face of the substrate 2. In this state, the starting portion of the taper portion of the lensed fibers 4a protruded from the front end face of the substrate 2. And the positions of the front end face of the substrate 2 and the front end face of the fixing member 6 were dislocated in the back-and-forth directions so that the front end face of the fixing member 6 be positioned 1 mm behind the front end face of the substrate 2. This arrangement made it easy to visually recognize the front end face of the substrate 2, which would serve as the reference face in protruding the lensed fibers 4a.

In the state described above, first ultraviolet-setting adhesive (epoxy resin adhesive: 80 MPa in Young's modulus) was applied to the rear end face of the fixing member 6, and caused to permeate into the gaps between the substrate 2, the lensed fibers 4a and the fixing member 6 by a capillary action. Although in this process part of the first ultraviolet-setting adhesive flowed toward the rear part of the substrate 2, the flow was blocked in the portion of the adhesive stopping concave grooves 2d, and the flow went no farther backwards. After confirming the formation of a meniscus on the front end face of the fixing member 6, the first ultraviolet-setting adhesive was cured by irradiation with ultraviolet rays, and the substrate 2, the lensed fibers 4a and the fixing member 6 were fastened to one another.

Further, the covered lensed fibers 4b were mounted over the covered lensed fiber supporting face 2c of the substrate 2, and fixed with the pressing member 10 to the covered lensed fiber supporting face 2c of the substrate 2. After that, second ultraviolet-setting adhesive 8b (denatured acrylate resin adhesive: 6 MPa in Young's modulus) was applied from the vicinity of the adhesive stopping concave grooves 2d and, after filling it between the intermediate face 2b and the covered lensed fiber supporting face 2c, cured by irradiation with ultraviolet rays, followed by the fastening of the substrate 2, the covered lensed fibers 4b, and the pressing member 10 to one another.

In the lensed fiber array 1 formed in this manner, no adhesive flowed round to and stuck the front end faces (in particular the front end faces of fiber cores) of the lensed fibers 4a. The fluctuations of the positions of the front end faces of the lensed fibers 4a were 1 μm or less, and the positional accuracy of the fiber cores was within 0.5 μm or less, both very satisfactory results.

Further, when the lensed fiber array was put to a high temperature high humidity test at a temperature of 85° C. and a humidity of 80% for a period of two weeks, no separation occurred among the substrate 2, the fixing member 6 and the pressing member 10, indicating a high level of reliability.

As is aforementioned, according to the present invention, it is possible to provide a lensed fiber array whose deterioration in optical characteristics due to adhesive having been stuck to the front end faces of the lensed fibers is prevented because the front end faces of the lensed fibers are protruded from the front end face of either the substrate or the fixing member. Moreover, although there is described in the present specification a lensed fiber array in which a plurality of lensed fibers are aligned, it goes without saying that a similar benefit would be provided even in the case of a lensed fiber array using a single lensed fiber.

The invention claimed is:

1. A lensed fiber array provided with lensed fibers having front end faces formed in a lens shape, a substrate including a face having a plurality of grooves respectively matching the lensed fibers, and a fixing member which aligns and fixes the lensed fibers by pressing the lensed fibers against a grooved face of the substrate, wherein the lensed fibers, the fixing member, and the grooved face of the substrate are fastened to one another with an adhesive;
wherein said front end faces of the lensed fibers protrude from at least one of a front end face of the substrate and a front end face of the fixing member.

2. The lensed fiber array of claim 1, wherein the front end faces of the lensed fibers are formed in said lens shape by configuring each front end to have a tapered portion and a spherical portion continuing therefrom, and the starting portion of said tapered portion protrudes from at least one of the front end face of the substrate and the front end face of the fixing member.

3. The lensed fiber array of claim 1, wherein a distance between the front end faces of said lensed fibers and the front end face of at least one of said substrate and said fixing member is 50 μm or more.

4. The lensed fiber array of claim 1, wherein positions of the front end face of the substrate and the front end face of the fixing member are dislocated in the back-and-forth directions.

5. The lensed fiber array of claim 4, wherein the front end face of said fixing member is positioned behind the front end face of said substrate.

6. The lensed fiber array of claim 1, wherein a portion from a leased fiber-suppressing face of said fixing member to at least one of the front end face and a rear end face of said fixing member is subjected to round-processing.

7. The tensed fiber array of claim 1, wherein a portion from the face of said substrate in which said grooves are formed to the front end face of said substrate is subjected to round-processing.

8. The lensed fiber array of claim 1, wherein a position of a rear end face of said fixing member is at least one of identical in back-and-forth positions with rear ends of said grooves in said substrate and before rear ends of said grooves in said substrate.

9. The lensed fiber array of claim 1, wherein the lensed fibers are covered in rear portions thereof, the substrate has one of an intermediate face and a covered lensed fiber supporting face positioned behind and lower than the face in which the grooves are formed, and a face in which the grooves are formed is continued stepwise until at least one of the intermediate face and the covered leased fiber supporting face, wherein concave grooves for stoppage of an adhesive are formed on at least one of the intermediate face and the covered lensed fiber supporting face.

10. The lensed fiber array of claim 1, wherein a meniscus is formed of the adhesive in the vicinity of at least one of the front end face of the substrate and the front end face of the fixing member.

11. A method for producing a lensed fiber array, comprising the steps of: preparing a substrate on one of whose faces grooves respectively matching lensed fibers are formed; mounting lensed fibers in said grooves of said substrate; pressing said lensed fibers with a fixing member against the face of said substrate in which said grooves are formed, aligned and fixed; and fastening said substrate, said leased fibers and said fixing member to one another with an adhesive, wherein said lensed fiber array includes a plurality of lensed fibers mounted in such a manner that said front end faces of said lensed fibers protrude from at least one of said front end face of said substrate and said front end face of said fixing member; and said substrate, said lensed fibers and said fixing member are fastened to one another by causing said adhesive to permeate gaps between said substrate, said lensed fibers and said fixing member from a rear end of said fixing member, when a plurality of lensed fibers are mounted on said grooves of said substrate.

12. A lensed fiber array provided with lensed fibers having front end faces formed in a lens shape, a substrate including a face having a plurality of grooves respectively matching the lensed fibers and a fixing member which aligns and fixes said lensed fibers by pressing said lensed fibers against a grooved face of said substrate, wherein said lensed fibers, said fixing member, and said grooved face of said substrate are fastened to one another with an adhesive;
    wherein said front end faces of said lensed fibers protrude from at least one of a front end face of said substrate and a front end face of said fixing member, and
    wherein said front end faces of said substrate and said fixing member are offset with respect to one another along an extension direction of said lensed fibers.

13. A method for producing a lensed fiber array comprising the steps of: preparing a substrate on one of whose faces grooves respectively matching lensed fibers are formed; mounting lensed fibers in said grooves of said substrate; pressing said lensed fibers with a fixing member against the face of said substrate in which said grooves are formed, aligned and fixed; fastening said substrate, said lensed fibers and said fixing member to one another with adhesive, wherein said lensed fiber array includes a plurality of lensed fibers mounted in such a manner that said front end faces of said lensed fibers protrude from at least one of said front end face of said substrate and said front end face of said fixing member; and said substrate, said lensed fibers and said fixing member are fastened to one another by causing said adhesive to permeate gaps between said substrate, said lensed fibers and said fixing member from a rear end of said fixing member, when a plurality of lensed fibers are mounted on said grooves of said substrate; wherein said front end faces of said substrate and said fixing member are offset with respect to one another along an extension direction of said lensed fibers.

* * * * *

UNITED STATES PATENT AND TRADEMARK OFFICE
CERTIFICATE OF CORRECTION

PATENT NO. : 7,095,922 B2  
APPLICATION NO. : 10/392089  
DATED : August 22, 2006  
INVENTOR(S) : Masashi Fukuyama and Hironori Kurimoto It is certified that error appears in the above-identified patent and that said Letters Patent is hereby corrected as shown below:

Column 10

*Lines 49 and 67*: please change "leased" to --lensed--
*Lines 52*: please change "tensed" to --lensed--

Column 11

*Line 14*: please change "leased" to --lensed--

Signed and Sealed this

Fourteenth Day of November, 2006

JON W. DUDAS
*Director of the United States Patent and Trademark Office*